(No Model.)
I. A. SYLVESTER.
TIDE AND CURRENT BREAKER.
No. 246,047. Patented Aug. 23, 1881.
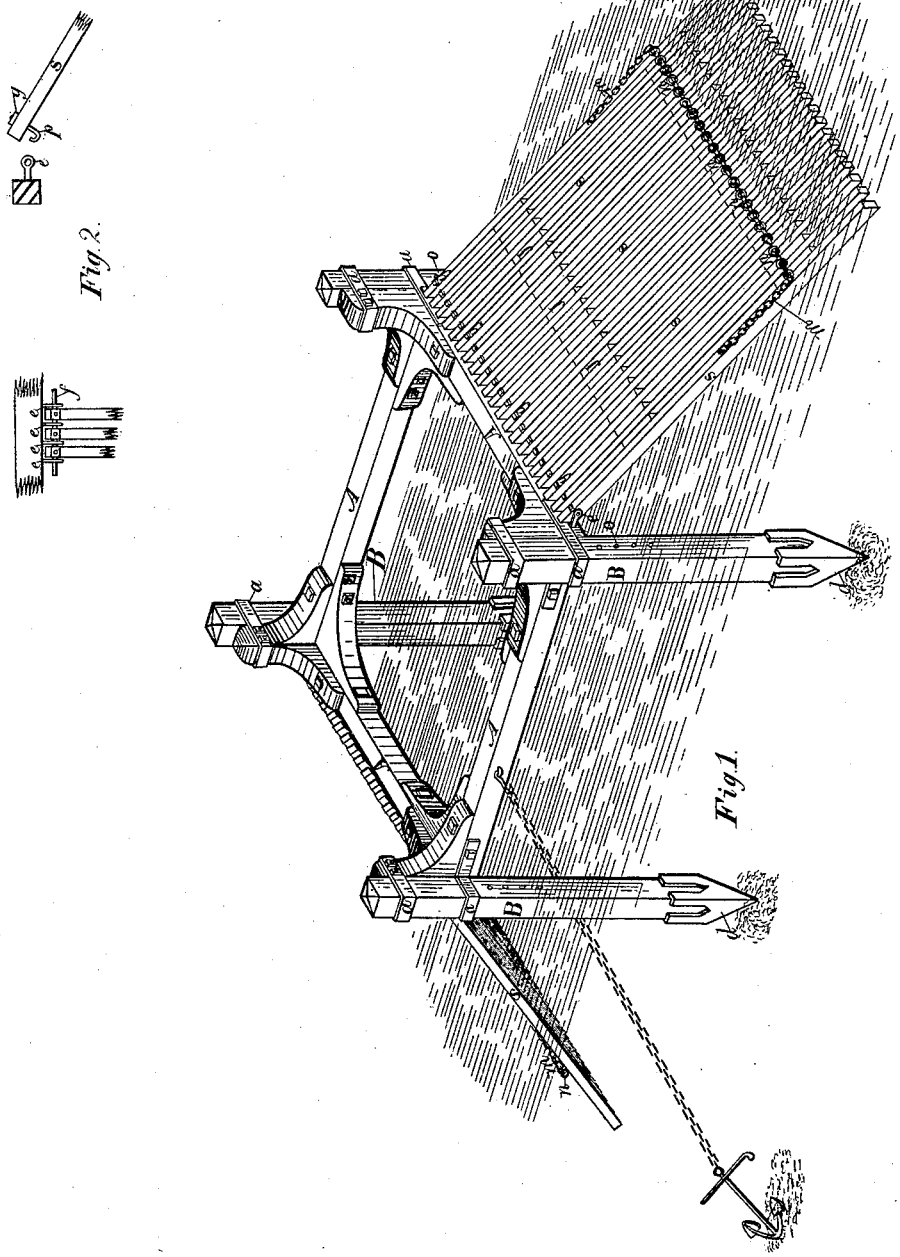
Witnesses.
H. B. Graham
J. B. Littlewood
Inventor.
Isaac A. Sylvester
By Stout & Underwood
Attorneys.

UNITED STATES PATENT OFFICE.

ISAAC A. SYLVESTER, OF NEWTON, MASSACHUSETTS.

TIDE AND CURRENT BREAKER.

SPECIFICATION forming part of Letters Patent No. 246,047, dated August 23, 1881.

Application filed June 22, 1881. (No model.)

To all whom it may concern:

Be it known that I, ISAAC A. SYLVESTER, of Newton, in the county of Middlesex and State of Massachusetts, have invented a certain device and Improvement in Tide and Current Breakers, to be known as the "Sylvester Tide and Current Breakers," of which the following is a specification.

This invention has for its object the retarding or breaking the force of tides or currents in rivers and tidal waters, so as to enable divers to work at all times, seasons, and places under water when it would be absolutely impossible to do so unless protected by this or some other like contrivances, as hereinafter more fully explained.

Of the accompanying drawings, forming a part of this specification, Figure 1 represents a top, side, and end elevation of the device embodying my invention. Fig. 2 represents views of details.

Similar letters of reference refer to like parts in all of the figures.

In carrying out my invention I provide a suitable frame or platform, A, constructed of heavy timbers thoroughly braced and bolted together, said platform to be made of any desirable length or width, preferably thirty by forty feet, though I do not confine myself to any specific dimensions. Strong iron braces, clamps, or sockets $a$ are firmly bolted to the frame A at the four corners, as shown in the drawings. Into these braces or sockets are loosely fitted suitable posts, B, of any desired length, and armed at the bottom with an iron shoe or point, $d$. By means of a series of holes, $o$, in the posts B to receive movable bolts, the platform A can be supported at any desired point on the posts B, when in use, preferably from two to three feet above the water, the frame A being raised to the desired position by a derrick or any suitable device, the whole weight of the platform and posts to be preferably from seven to eight tons.

A series of eyebolts, $e$, are set in each end of the platform A, and through these eyebolts, extending the whole width of the platform, is inserted an iron rod, $f$, Fig. 2. To this rod $f$ are attached a series of planks or joists, $s$, preferably four by six inches, and of any desired length, but somewhat longer than the posts B, so that they always incline at an angle by means of the bolts $p$, Fig. 2. These open bolts take hold of the rod $f$, and are screwed home against the planks $s$ by the nut $g$. The planks $s$ are preferably arranged by the means of a series of blocks, $j$, so as to allow a space of three inches between each; or blocks of any desired thickness may be used, either to increase or lessen this space, when required. These blocks are to be attached to the planks $s$ about four feet from each end, as shown in the drawings.

A series of eyebolts, $n$, are inserted in the planks $s$, about four feet from the lower end, and through these eyebolts $n$ is passed a strong iron cable or chain, $m$, to secure and firmly hold in place the planks $s$, the chain being fastened at each end by any suitable contrivance, so arranged that it may be drawn out at pleasure and any one of the planks $s$ removed, changed, or renewed.

As will be seen from my description, the series of planks $s$, connected as set forth, constitute the tide and current breakers, and, being attached to the rod $f$, work as on a swivel, rising or falling by the force of the tide or current acting against them, and thus affording under their lee comparatively still water, in which the divers can perform any work required. The planks $s$ are each purposely set the three inches apart in order to allow a sufficient current of water to pass through their spaces and remove or carry off the muddy water resulting from stirring up the bottom, as otherwise the work could not be accomplished to advantage.

When the tide or current breakers are used in harbor or river service the upper series of planks $s$, are inclined at an angle and rest on the bottom on the ebb tide, or the current of a river while on the flood tide. The lower one inclines in the same manner.

Under the protection of these tide and current breakers work can be constantly carried on in rapid streams and tidal waters, such as repairing and building dams, removing obstructions, or any other labor demanded, equally as well in a rapid current, or on the flood and ebb tide, as in still water, thus making my invention of great value and utility, inasmuch as the hours of labor are not limited by currents or the changes of the tide.

When the current or tide is of unusual force the platform, with the tide and current breakers attached, may be securely moored or anchored by any suitable arrangement, as shown in the drawings, though under ordinary circumstances this is not required, as its own weight will keep it in position.

Having thus described my invention, what I claim is—

1. A series of adjustable planks with separating blocks, a chain to secure the same, running through eyebolts, with closing hooks to fasten the planks to a rod secured by eyebolts in a frame or platform, arranged and combined to constitute a self-acting tide and current breaker, substantially as set forth.

2. The combination of the platform A, the posts B, with holes to regulate the height of the platform, and the adjustable planks s, hinged to the platform A and secured loosely together at their lower ends by a suitable chain or cable, substantially as set forth.

3. The combination of the platform A, the posts B, and the adjustable planks s, so arranged by the means of the separating-blocks and the movable chain that a current of water may pass through the spaces between the planks with only sufficient force to remove the muddy water, and yet retard and so regulate its force as not to incommode the divers while at work, as substantially set forth.

4. The combination of the platform A, the posts B, and the adjustable planks s, as described, with a suitable device attached to the platform A, for the purpose of mooring or anchoring the same, substantially as set forth.

In testimony whereof I have signed my name to this specification, in the presence of two subscribing witnesses, this 30th of May, 1881.

ISAAC A. SYLVESTER.

Witnesses:
 ARTHUR D. MCCLELLAN,
 CHARLES C. BARTON.